United States Patent
Sheu et al.

(10) Patent No.: US 12,425,417 B2
(45) Date of Patent: Sep. 23, 2025

(54) SYSTEMS AND METHODS FOR GENERATION AND IMPLEMENTATION OF CYBER DECEPTION STRATEGIES

(71) Applicant: The MITRE Corporation, McLean, VA (US)

(72) Inventors: Ray-Yuan Sheu, Bel Air, MD (US); Shawn Paul Johnson, Columbia, MD (US); Cory Hall, Severn, MD (US); Ronald Wayne Alford, Vienna, VA (US); James Raymond Morris-King, Acton, MA (US)

(73) Assignee: The MITRE Corporation, McLean, VA (US)

( * ) Notice: Subject to any disclaimer, the term of this patent is extended or adjusted under 35 U.S.C. 154(b) by 286 days.

(21) Appl. No.: 17/671,203

(22) Filed: Feb. 14, 2022

(65) Prior Publication Data
US 2023/0262073 A1     Aug. 17, 2023

(51) Int. Cl.
*H04L 9/40*     (2022.01)
*G06F 21/62*     (2013.01)

(52) U.S. Cl.
CPC ...... *H04L 63/1416* (2013.01); *G06F 21/6218* (2013.01); *H04L 63/1433* (2013.01); *H04L 63/1491* (2013.01)

(58) Field of Classification Search
None
See application file for complete search history.

(56) References Cited

U.S. PATENT DOCUMENTS 7,117,532 B1 * 10/2006 Lyle .................... H04L 63/1416
                                                                     709/200
9,043,905 B1     5/2015 Allen et al.
(Continued)

FOREIGN PATENT DOCUMENTS

| CN | 107729752 A | 2/2018 | |
|---|---|---|---|
| DE | 102021106823 B3 * | 9/2022 | ......... H04L 63/1416 |

OTHER PUBLICATIONS

Shi, Leyi et al., "Research on Optimization of Array Honeypot Defense Strategies Based on Evolutionary Game Theory", MDPI, Mathematics, 2021, 9, 805. https://doi.org/10.3390/math9080805, pp. 1-21. (Year: 2021).*

(Continued)

*Primary Examiner* — Michael Pyzocha
(74) *Attorney, Agent, or Firm* — Morrison & Foerster LLP

(57) ABSTRACT

Described herein are systems and methods for generating a cyber-deception strategy that adaptively implement a decoy file placement strategy for thwarting malicious activity on a computing network. The systems and methods can include a plurality of surveillance services that can monitor the evolving conditions and states of a target computing network. The information from the external surveillance services can be combined with one or more user defined parameters to serve as inputs to a system that can use the input data to generate a decoy file content and placement strategy so as to effect a cyber-deception strategy. In one or more examples, can identify one or more target objects to use as decoys and use the identified targeted objects as well as information about the target network, to generate a high-level guidelines that will be used to generate one or more deception plans for implementation on the target network.

39 Claims, 9 Drawing Sheets

(56) References Cited

U.S. PATENT DOCUMENTS

| | | | | |
|---|---|---|---|---|
| 9,805,312 | B1* | 10/2017 | Shaked | G06F 16/22 |
| 10,110,629 | B1* | 10/2018 | Kruse | H04L 63/1491 |
| 10,277,629 | B1* | 4/2019 | Guntur | G06F 16/285 |
| 10,333,976 | B1* | 6/2019 | Yudovich | H04L 63/1416 |
| 10,382,483 | B1* | 8/2019 | Kafri | H04L 63/1491 |
| 10,454,969 | B2* | 10/2019 | Haerterich | H04L 63/1491 |
| 11,050,787 | B1* | 6/2021 | Sharifi Mehr | G06F 9/45558 |
| 11,934,948 | B1* | 3/2024 | Ferguson-Walter | G06N 3/045 |
| 2009/0044272 | A1* | 2/2009 | Jarrett | G06F 21/568 |
| | | | | 726/23 |
| 2011/0067107 | A1* | 3/2011 | Weeks | H04L 63/0209 |
| | | | | 726/23 |
| 2016/0359882 | A1* | 12/2016 | Touboul | G06F 21/55 |
| 2017/0223039 | A1* | 8/2017 | Mont | H04L 41/40 |
| 2017/0324755 | A1* | 11/2017 | Dekel | G06F 21/60 |
| 2018/0020021 | A1* | 1/2018 | Gilmore | H04L 63/1441 |
| 2018/0165459 | A1* | 6/2018 | Baldwin | G06F 21/64 |
| 2018/0309787 | A1* | 10/2018 | Evron | G06F 11/00 |
| 2018/0332005 | A1* | 11/2018 | Ettema | H04L 63/0227 |
| 2019/0081980 | A1* | 3/2019 | Luo | G06N 20/00 |
| 2019/0132358 | A1* | 5/2019 | DiValentin | H04L 63/1416 |
| 2019/0132359 | A1* | 5/2019 | Kraenzel | H04L 63/1491 |
| 2020/0014722 | A1* | 1/2020 | Walters | G06F 11/3684 |
| 2020/0045069 | A1* | 2/2020 | Nanda | H04L 63/1425 |
| 2020/0067981 | A1* | 2/2020 | Ramachandra | H04L 43/08 |
| 2020/0204590 | A1* | 6/2020 | Whitham | G06F 21/565 |
| 2021/0160283 | A1* | 5/2021 | St. Pierre | H04L 63/1491 |
| 2021/0194925 | A1* | 6/2021 | Xiao | H04L 63/0227 |
| 2021/0203696 | A1* | 7/2021 | Sellers | H04L 41/0806 |
| 2021/0211466 | A1* | 7/2021 | Sellers | H04L 63/20 |
| 2021/0279332 | A1* | 9/2021 | Goldshmidt | G06F 21/566 |
| 2021/0377307 | A1* | 12/2021 | Santana De Oliveira | |
| | | | | G06F 18/217 |
| 2021/0409446 | A1* | 12/2021 | Di Mattia | H04L 63/1408 |
| 2022/0286478 | A1* | 9/2022 | Whitham | G06F 21/565 |
| 2023/0068346 | A1* | 3/2023 | Hebert | G06F 21/54 |
| 2024/0031407 | A1* | 1/2024 | Lin | H04L 63/1416 |
| 2024/0236148 | A1* | 7/2024 | Bellekens | H04L 63/1491 |

OTHER PUBLICATIONS

Tian, Wen et al., "Defense Strategies Against Network Attacks in Cyber-Physical Systems with Analysis Cost Constraint Based on Honeypot Game Model", CMC, vol. 60, No. 1, pp. 193-211, 2019. (Year: 2019).*

Horák, Karel et al., "Optimizing honeypot strategies against dynamic lateral movement using partially observable stochastic games", Computers & Security 87 (2019) 101579, pp. 1-15. (Year: 2019).*

* cited by examiner

SYSTEMS AND METHODS FOR GENERATION AND IMPLEMENTATION OF CYBER DECEPTION STRATEGIES

STATEMENT REGARDING FEDERALLY SPONSORED RESEARCH OR DEVELOPMENT

This invention was made with Government support under U.S. Government Contract No. FA8702-22-C-0001 awarded by the Department of Defense (Air Force). The Government has certain rights in this invention.

FIELD OF THE DISCLOSURE

This disclosure relates to systems and methods for generating cyber deception strategies that maximize an attacker's costs while minimizing impacts to a computing network and its legitimate users.

BACKGROUND OF THE DISCLOSURE

As business organizations and other entities become more reliant on computers and computing networks to carry out their day-to-day operations, their exposure to cyber-attacks have increased, and the consequences stemming from a cyber-attack have become more costly. Commonly, attackers seek access to an entities' computing network for the purpose of data exfiltration—i.e., gaining access to and copying files that are stored within the computing network. In many instances, an Advanced Persistent Threat (APT) (typically a nation state or state-sponsored group) can gain unauthorized access to a computer network and remain undetected for an extended period of time. While remaining undetected, the APT can scour the computer network for files of interest and then try and extract those files for malicious use. For instance, if a computing network contains schematics and detailed technical information relating to a company's trade secrets, then an APT can copy those files in an attempt to steal the trade secret.

Deterring a cyber-attack can be a complicated endeavor. For instance, any deterrence schemes or mechanisms should seek to minimize disruption or frustration to legitimate uses of the computing network, in addition to effectively deterring an attack. Furthermore, if an APT is alerted to a deterrence scheme, the APT may retaliate by seeking to damage or even destroy a computing network, rather than simply seeking to steal files. One strategy for deterring a cyber-attack is to deploy deception objects into a network, and placing those objects strategically within the network to maximize the probability that an APT will steal the deception objects rather than legitimate files within the network.

A key challenge for deceptive operation is to create the best plans to deploy the deception objects considering there are many contributing factors such as mission priority or goals, choices of objects (e.g., files, tokens, login, etc.), selections or designs of deceptive object features (e.g., content types, languages, etc.), locations (e.g., nodes, network shares, etc.), and other possible options including how potentially attackers might choose their targeted objects or what actions the attackers might choose. Thus, what is needed is a system that can generate a cyber-deception strategy that can take into account the factors described above and calculate a solution to a complex deceptive operation problem which can involve game theory, probabilistic theory, machine learning, information theory, and more depending upon the approaches being chosen.

SUMMARY OF THE DISCLOSURE

According to an aspect, a system and method for generating a cyber-deception strategy can include a plurality of surveillance services that can monitor the evolving conditions and states of a target computing network. In one or more examples, the information from the external surveillance services can be combined with one or more user defined parameters to serve as inputs to a system that can use the input data to generate a decoy file content and placement strategy so as to effect a cyber-deception strategy. In one or more examples, the system and methods can combine the user-defined parameters and the information from the external surveillance services to generate a latent parameters model. Using the latent parameters model, the systems and methods described herein can execute an objects selection process in which one or more multiple-stage machine learning algorithms are applied to the data to select and filter a candidate set of targeted objects (i.e., files in the network to be used to generate decoys). In one or more examples, once the targeted objects have been identified, the system and methods described herein use the identified targeted objects as well as information about the target network, to generate a high-level guidelines that will be used to generate one or more deception plans for implementation on the target network. Finally, in one or more examples, using the high-level guidelines, the systems and methods described herein can apply game theoretic optimization computations to generate one or more recommended deception plans with ranking of scores for users to consider deploying to the target computing network. In one or more examples, the systems and methods described herein can include one or more processes for deploying the recommended deception plan onto the targeted network.

According to an aspect, the system and methods described herein can further include one or processes and components that are collectively configured to apply continuous and/or temporal deception operations to the target network. In one or more examples, the system can encode current and past states of the target network (during use of a deception plan), to generate assessments of the deceptions plans. In one or more examples, using the generated assessments, the systems and methods can modify and self-improve its ability to create innovative and optimal deception plans for future deployment on the system, thereby presenting the APT with a changing variety of deceptions, thus frustrating their ability to generate counter-measures against the deception.

In one or more examples of the disclosure, a method for generating a cyber deception strategy to be implemented on a computing network comprises: receiving one or more user preferences regarding the cyber deception strategy to be implemented on the computing network, receiving a plurality of candidate objects from the computing network, wherein the plurality of candidate objects include one or more files stored on the computing network that will be used to generate decoy files for the cyber deception strategy, selecting one or more candidate objects of the plurality of candidate objects to be used in the cyber deception strategy based on the received one or more user preferences, determining one or more cyber-attacks occurring on the computing network, generating a plurality of candidate deception actions based on the selected one or more candidate objects and based on the one or more determined cyber-attacks occurring on the computing network, applying an optimization process to the to the generated plurality of candidate deception actions, wherein the optimization process is configured to maximize a reward associated with implementation of the plurality of candidate deception actions and minimize a cost associated with the plurality of candidate deception actions, and selecting one or more the of candidate deceptions actions for implementation on the computing network based on one or more results of the optimization process.

Optionally, selecting one or more candidate objects of the plurality of candidate objects to be used in the cyber deception strategy comprises applying one or filters to the plurality of candidate objects, wherein each filter is configured to reduce a number of the plurality candidate objects to be selected to be used in the cyber deception strategy.

Optionally, the method comprises receiving a statistical data distribution model, wherein the received statistical data distribution model comprises information regarding an efficacy of the one or more candidate objects for use in the cyber deception strategy and wherein generating the one or more filters is based on the received statistical data distribution model.

Optionally, the one or more filters are configured to the number of the plurality of candidate objects to be selected to be used in the cyber deception strategy based on metadata associated with the plurality of candidate objects.

Optionally, determining one or more cyber-attacks occurring on the target network comprises: receiving information regarding a malicious user's activities within the computing network, and identifying one or more attack types using an attack knowledge database, wherein the attack knowledge database is configured to relate a malicious user's activities to an attack type.

Optionally, generating a plurality of candidate deception actions comprises: selecting one or more pre-defined action templates for each generated candidate deception action, wherein each pre-defined action template comprises instructions for implementing the candidate deception action on the computing system, and wherein each pre-defined action template includes one or more placeholders for candidate objects, and populating each selected pre-defined action template with the selected one or more candidate objects.

Optionally, the method comprises ranking the selected one or more pre-defined action templates for each generated candidate deception action based on a probability of success associated with each selected pre-defined action template.

Optionally, the selected one or more pre-defined action templates are removed based on its ranking.

Optionally, applying the optimization process comprises using a cost model configured to quantify the cost associated with a candidate deception action of the plurality of generated deception actions.

Optionally, a cost associated with a candidate deception action includes an amount of time required to implement the candidate deception plan on the computing network.

Optionally, the method comprises implementing the selected one or more candidate deception actions on the computing network.

Optionally, the method comprises: receiving information regarding a state of the computing network, determining the presence of one or more patterns with the received information and the selected one or more candidate deceptions actions, and modifying the optimization process based on the determined presence of one or more patterns.

In one or more examples of the disclosure, a system for generating a cyber deception strategy to be implemented on a computing network comprises: a memory, one or more processors, wherein the memory stores one or more programs that when executed by the one or more processors, cause the one or more processors to: receive one or more user preferences regarding the cyber deception strategy to be implemented on the computing network, receive a plurality of candidate objects from the computing network, wherein the plurality of candidate objects include one or more files stored on the computing network that will be used to generate decoy files for the cyber deception strategy, select one or more candidate objects of the plurality of candidate objects to be used in the cyber deception strategy based on the received one or more user preferences, determine one or more cyber-attacks occurring on the computing network, generate a plurality of candidate deception actions based on the selected one or more candidate objects and based on the one or more determined cyber-attacks occurring on the computing network, apply an optimization process to the to the generated plurality of candidate deception actions, wherein the optimization process is configured to maximize a reward associated with implementation of the plurality of candidate deception actions and minimize a cost associated with the plurality of candidate deception actions, and select one or more the of candidate deceptions actions for implementation on the computing network based on one or more results of the optimization process.

Optionally, selecting one or more candidate objects of the plurality of candidate objects to be used in the cyber deception strategy comprises applying one or filters to the plurality of candidate objects, wherein each filter is configured to reduce a number of the plurality candidate objects to be selected to be used in the cyber deception strategy.

Optionally, the processor is caused to receive a statistical data distribution model, wherein the received statistical data distribution model comprises information regarding an efficacy of the one or more candidate objects for use in the cyber deception strategy and wherein generating the one or more filters is based on the received statistical data distribution model.

Optionally, the one or more filters are configured to the number of the plurality of candidate objects to be selected to be used in the cyber deception strategy based on metadata associated with the plurality of candidate objects.

Optionally, determining one or more cyber-attacks occurring on the target network comprises: receiving information regarding a malicious user's activities within the computing network, and identifying one or more attack types using an attack knowledge database, wherein the attack knowledge database is configured to relate a malicious user's activities to an attack type.

Optionally, generating a plurality of candidate deception actions comprises: selecting one or more pre-defined action templates for each generated candidate deception action, wherein each pre-defined action template comprises instructions for implementing the candidate deception action on the computing system, and wherein each pre-defined action template includes one or more placeholders for candidate objects, and populating each selected pre-defined action template with the selected one or more candidate objects.

Optionally, the processor is caused to rank the selected one or more pre-defined action templates for each generated candidate deception action based on a probability of success associated with each selected pre-defined action template.

Optionally, the selected one or more pre-defined action templates are removed based on its ranking.

Optionally, applying the optimization process comprises using a cost model configured to quantify the cost associated with a candidate deception action of the plurality of generated deception actions.

Optionally, a cost associated with a candidate deception action includes an amount of time required to implement the candidate deception plan on the computing network.

Optionally, the processor is caused to implement the selected one or more candidate deception actions on the computing network.

Optionally, the processor is caused to: receive information regarding a state of the computing network, determine the presence of one or more patterns with the received information and the selected one or more candidate deceptions actions, and modify the optimization process based on the determined presence of one or more patterns.

In one or more examples, a non-transitory computer readable storage medium storing one or more programs for generating a cyber deception strategy to be implemented on a computing network for execution by one or more processors of an electronic device that when executed by the device, cause the device to: receive a plurality of candidate objects from the computing network, wherein the plurality of candidate objects include one or more files stored on the computing network that will be used to generate decoy files for the cyber deception strategy, select one or more candidate objects of the plurality of candidate objects to be used in the cyber deception strategy based on the received one or more user preferences, determine one or more cyber-attacks occurring on the computing network, generate a plurality of candidate deception actions based on the selected one or more candidate objects and based on the one or more determined cyber-attacks occurring on the computing network, apply an optimization process to the to the generated plurality of candidate deception actions, wherein the optimization process is configured to maximize a reward associated with implementation of the plurality of candidate deception actions and minimize a cost associated with the plurality of candidate deception actions, and select one or more the of candidate deceptions actions for implementation on the computing network based on one or more results of the optimization process.

Optionally, selecting one or more candidate objects of the plurality of candidate objects to be used in the cyber deception strategy comprises applying one or filters to the plurality of candidate objects, wherein each filter is configured to reduce a number of the plurality candidate objects to be selected to be used in the cyber deception strategy.

Optionally, the device is caused to receive a statistical data distribution model, wherein the received statistical data distribution model comprises information regarding an efficacy of the one or more candidate objects for use in the cyber deception strategy and wherein generating the one or more filters is based on the received statistical data distribution model.

Optionally, the one or more filters are configured to the number of the plurality of candidate objects to be selected to be used in the cyber deception strategy based on metadata associated with the plurality of candidate objects.

Optionally, determining one or more cyber-attacks occurring on the target network comprises: receiving information regarding a malicious user's activities within the computing network, and identifying one or more attack types using an attack knowledge database, wherein the attack knowledge database is configured to relate a malicious user's activities to an attack type.

Optionally, generating a plurality of candidate deception actions comprises: selecting one or more pre-defined action templates for each generated candidate deception action, wherein each pre-defined action template comprises instructions for implementing the candidate deception action on the computing system, and wherein each pre-defined action template includes one or more placeholders for candidate objects, and populating each selected pre-defined action template with the selected one or more candidate objects.

Optionally, the device is caused to rank the selected one or more pre-defined action templates for each generated candidate deception action based on a probability of success associated with each selected pre-defined action template.

Optionally, the selected one or more pre-defined action templates are removed based on its ranking.

Optionally, applying the optimization process comprises using a cost model configured to quantify the cost associated with a candidate deception action of the plurality of generated deception actions.

Optionally, a cost associated with a candidate deception action includes an amount of time required to implement the candidate deception plan on the computing network.

Optionally, the device is caused to implement the selected one or more candidate deception actions on the computing network.

Optionally, the device is caused to: receive information regarding a state of the computing network, determine the presence of one or more patterns with the received information and the selected one or more candidate deceptions actions, and modify the optimization process based on the determined presence of one or more patterns.

BRIEF DESCRIPTION OF THE FIGURES

The invention will now be described, by way of example only, with reference to the accompanying drawings, in which.

DETAILED DESCRIPTION OF THE DISCLOSURE

Figure 1:
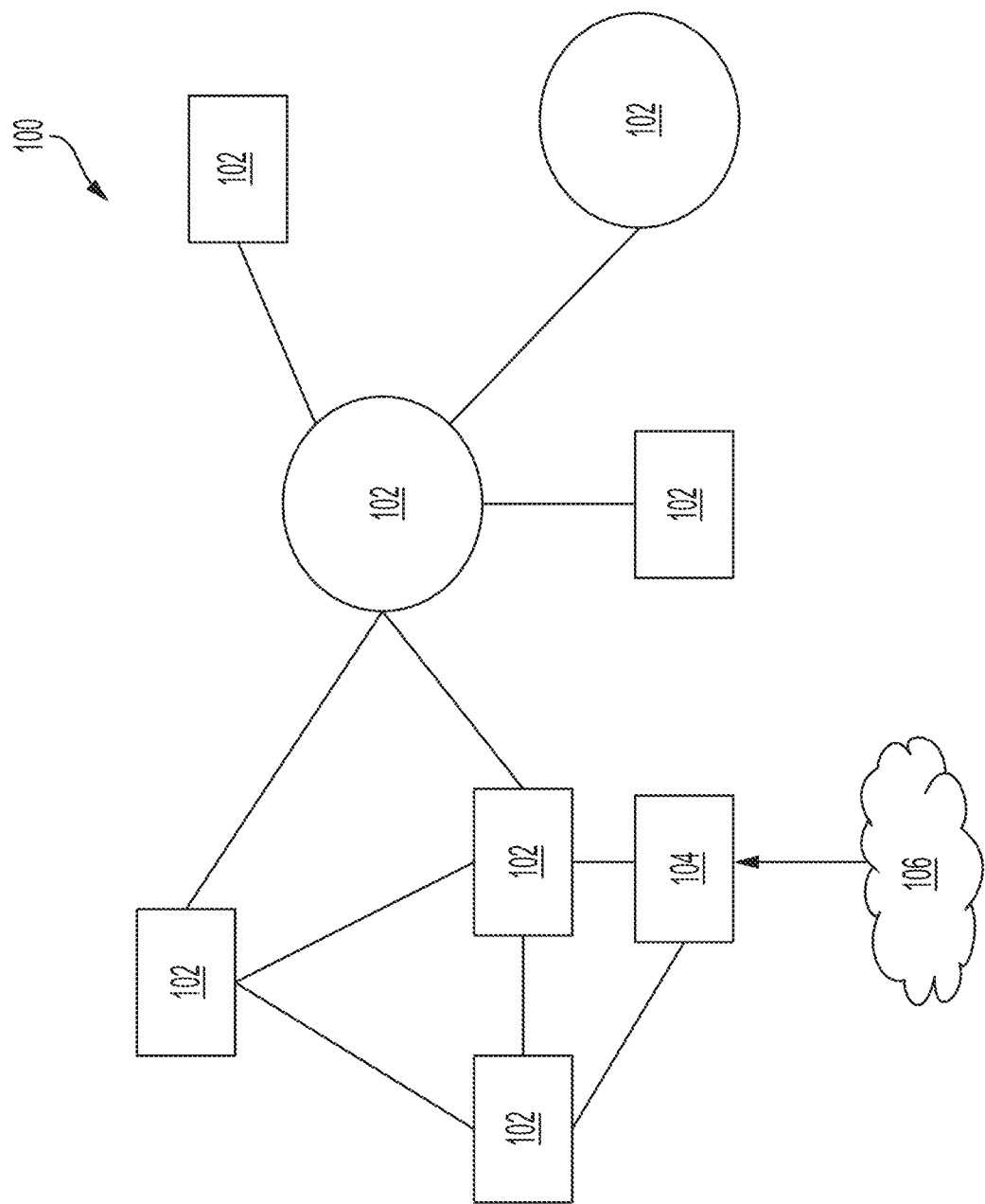
FIG. 1 illustrates an exemplary target computing network according to examples of the disclosure.

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

Described herein are systems and methods systems and methods for generating cyber deception strategies that maximize an attacker's costs while minimizing impacts to a computing network and its legitimate users. In one or more examples, the systems and methods can utilize information about a target computing network gathered by one or more surveillance services, as well as a plurality of user-defined parameters to generate and place one or more decoy files within the target computing network in a manner to frustrate an APT's ability to extract useful information from an authorized entry into the target network, while also minimizing frustration of legitimate users and uses of the computing network.

In one or more examples, a system and method for generating a cyber-deception strategy can include a plurality of surveillance services that can monitor the evolving conditions and states of a target computing network. In one or more examples, the information from the external surveillance services can be combined with one or more user defined parameters to serve as inputs to a system that can use the input data to generate a decoy file content and placement strategy so as to effect a cyber-deception strategy. In one or more examples, the system and methods can combine the user-defined parameters and the information from the external surveillance services to generate a latent parameters model. Using the latent parameters model, the systems and methods described herein can execute an objects selection process in which one or more multiple-stage machine learning algorithms are applied to the data to select and filter a candidate set of targeted objects (i.e., files in the network to be used to generate decoys). In one or more examples, once the targeted objects have been identified, the system and methods described herein use the identified targeted objects as well as information about the target network, to generate high-level guidelines that will be used to generate one or more deception plans for implementation on the target network. Finally, in one or more examples, using the high-level guidelines, the systems and methods described herein can apply game theoretic optimization computations to generate one or more recommended deception plans with ranking of scores for users to consider deploying to the target computing network. In one or more examples, the systems and methods described herein can include one or more processes for deploying the recommended deception plan onto the targeted network.

In one or more examples, the system and methods described herein can further include one or processes and components that are collectively configured to apply continuous and/or temporal deception operations to the target network. In one or more examples, the system can encode current and past states of the target network (during use of a deception plan), to generate assessments of the deceptions plans. In one or more examples, using the generated assessments, the systems and methods can modify and self-improve its ability to create innovative and optimal deception plans for future deployment on the system, thereby presenting the APT with a changing variety of deceptions, thus frustrating their ability to generate counter-measures against the deception.

In the following description of the various embodiments, it is to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps and instructions described herein in the form of an algorithm. It should be noted that the process steps and instructions of the present disclosure could be embodied in software, firmware, or hardware and, when embodied in software, could be downloaded to reside on and be operated from different platforms used by a variety of operating systems. Unless specifically stated otherwise as apparent from the following discussion, it is appreciated that, throughout the description, discussions utilizing terms such as "processing," "computing," "calculating," "determining," "displaying," "generating" or the like, refer to the action and processes of a computer system, or similar electronic computing device, that manipulates and transforms data represented as physical (electronic) quantities within the computer system memories or registers or other such information storage, transmission, or display devices.

The present disclosure in some embodiments also relates to a device for performing the operations herein. This device may be specially constructed for the required purposes, or it may comprise a general purpose computer selectively activated or reconfigured by a computer program stored in the computer. Such a computer program may be stored in a non-transitory, computer readable storage medium, such as, but not limited to, any type of disk, including floppy disks, USB flash drives, external hard drives, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each connected to a computer system bus. Furthermore, the computing systems referred to in the specification may include a single processor or may be architectures employing multiple processor designs, such as for performing different functions or for increased computing capability. Suitable processors include central processing units (CPUs), graphical processing units (GPUs), field programmable gate arrays (FPGAs), and ASICs.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present disclosure as described herein.

Business organizations, governmental entities, and other enterprises of varying sizes and purposes rely on computing networks to share data amongst members of the enterprise, and to carry out tasks. Computing networks allow users of an organization to connect multiple machines (i.e., end-user computing systems, servers, firewalls, etc.) so that they can communicate with one another, as well as so that data can be transferred between them. Often times, computing networks not only provide users with access to other machines in the organization, but also provide access to external machines (i.e., via the internet). FIG. 1 illustrates an exemplary target computing network according to examples of the disclosure. In one or more examples, the exemplary computing network 100 of FIG. 1 can include one or more nodes 102. In one or more examples, nodes 102 represent various computing resources that are operated by an enterprise or organization. In one or more examples, each of the nodes 102 can be interconnected with one another (either directly or indirectly) to form the network 100. In one or more examples, the network 100 can also include one or more nodes 104 that can be communicatively coupled to an external network 106. In one or more examples, the external network 106 can include the world wide web (WWW) or other external networks that are not part of the organization's computing network 100. In one or more examples, node 104, which can be coupled to an external network 106 can allow a user or users within the organization to access information and other resources that are stored in other networks or machines that are external to the computing network 100.

While access to an external network can allow for the users of the network to access data external to the network, as well as facilitate access to the network from external users who are authorized to access the network, it can also create security risks for the data owned and maintained by the organization. As an example, if an organization stores its intellectual property (i.e., designs, specifications, requirements) regarding a product it is developing on the computing network 100, then by allowing external access to the computing network 100 via a node 104, the intellectual property may be at risk for exfiltration (i.e., copying and removal outside of the network) by one or more malicious user's seeking to copy the intellectual property, for instance for the purpose of copying the products designed by the organization.

In order to prevent unauthorized access to data stored in the computing network, many network security systems have been developed to not only detect unauthorized access to a computing network, but also to remove malicious users from the system. These systems however may do little, if anything, towards discouraging the authorized access thereby preventing it. For instance, if a user's only consequence for unauthorized access to a network is detection and removal, then the malicious user may simply try to access the same network again, since the consequence of being caught is nothing more than removal from the network. In one or more examples, if a malicious or unauthorized user becomes aware of the efforts by the organization to detect their presence and remove them, then the malicious user may even attempt to damage or destroy the computing networking by leveraging their unauthorized access to the network.

One method for preventing unauthorized access to a computing network is to raise the costs to a malicious user for engaging in the unauthorized access. For instance, using the intellectual property example presented above, if a malicious user gains unauthorized access to a network and removes design files that they then use to copy an organization's designs, if those design files that were removed lead to a product that does not operate, and were purposefully placed in the network to frustrate unauthorized users, then the malicious users may be discouraged from accessing the network again. In other words, if an organization places one or more "decoy" files in their computing network that are made to look like legitimate files, but actually contain no useful data or even contain data that is meant to mislead an adversary, then the cost of the unauthorized access for the adversary will be increased, hopefully to the point that the adversary deems the cost too great to continue or repeat the unauthorized access.

Placing decoy files in a computing network for the purposes of frustrating and discouraging unauthorized access to the network can be a complex endeavor that can involve the consideration of many factors. In one or more examples, a strategy for placing decoy files in a computing network should not only be tailored towards maximizing the cost of the unauthorized access for an adversary by luring the adversary to exfiltrate the decoy files, but should also take care not to frustrate the business objectives of the organization and the users who legitimately use the network. In one or more examples, the processing of creating and placing decoy files in a computing network can be a time consuming and resource intensive process. Not only does the content of decoy files have to be generated such that they maximize the likelihood that a malicious user will exfiltrate them, but they also need to be strategically placed within the computing network to also maximize the likelihood that the unauthorized user will encounter the files while accessing the network. Furthermore, in one or more examples, the process of generating and placing decoy files can be a continuous operation that is responsive to the evolving state of the computing network, as well as responsive to the actions of a malicious user. Thus, in one or more examples, rather than simply generating and placing decoy files one time, in one or more examples, the files can be generated and placed in real-time so as to maximize their chance for success. Thus, the process of generating and placing decoy files can in and of itself be a time and labor intensive process (since a network may contains thousands of files and thousands of nodes), but doing so in real-time can further add to the time and resources required to engage in such deception operations. Thus, in one or more examples, automating the process of generating and placing decoy files in the computing system, and doing so in a real-time manner that is responsive to evolving conditions of the network, can not only raise the costs of unauthorized access for a malicious user, but can also engender savings in time and resources expended by an organization to implement cyber-deception techniques that utilized decoy files.

Figure 2:
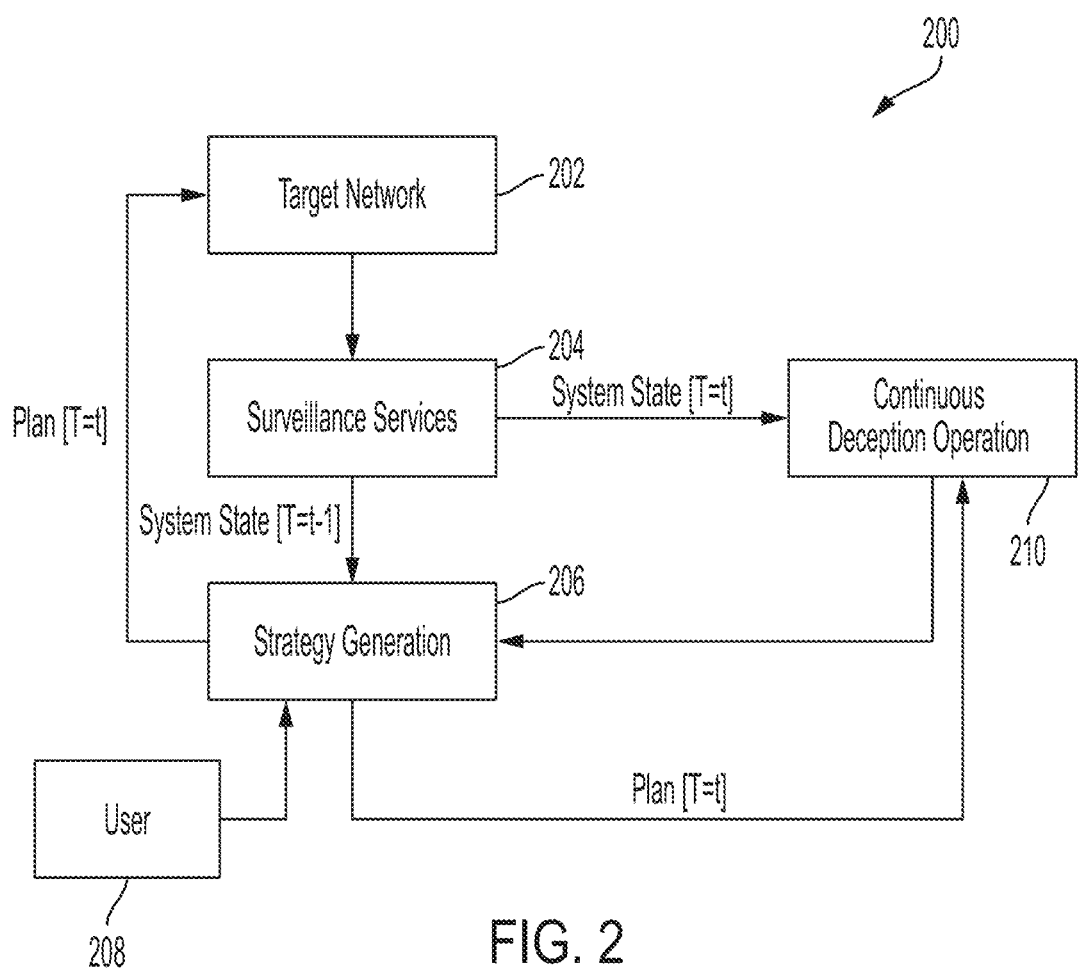
FIG. 2 illustrates an exemplary system for automatically generating a cyber-deception plan according to examples of the disclosures.

FIG. 2 illustrates an exemplary system for automatically generating a cyber-deception plan according to examples of the disclosures. In one or more examples, the system 200 depicted in FIG. 2 can be configured to automatically generate one or more strategies for generating and placing decoy files in a computing network based on user preferences and real-time conditions of the network including adversary activity within the network. In one or more examples, the system 200 can include a target network 202 which can represent one or more interconnected computing resources similar to the example described above with respect to FIG. 1. In one or more example, the system 200 can include one or more surveillance services 204 which can be utilized to monitor the target network and extract information pertaining to the target network. For instance, in one or more examples, the one or more surveillance services 204 can monitor the target system 202 and provide information about the mapping of the system (i.e., how the nodes of the system are connected with one another) as well as information about an adversary's activity on the system, and information about the files and directories that are stored in the target system 202. As will be described in further detail below, the information gathered from the one or more surveillance services 204 can used to generate one or decoy/deception strategies on a real-time basis to be implemented on a target system.

In one or more examples, the one or more surveillance services 204 can provide a plurality of periodic snapshots of the network parameters/metrics taken at a particular time, and can not only provide information about the current state of the target, but can also provide information regarding past states of the target system. For instance, and as illustrated at FIG. 2, the one or more surveillance services 204 can provide information about the current state of the system (denoted in the figure as the system state [T=t]) to a continuous deception operations unit 210 (the operation of which is described in further detail below). The system state provided to the continuous deception operations unit 210 can reflect the state of the system at the current time interval. Additionally, in one or more examples, the one or more surveillance services 204 can provide information about prior states of the system. For instance, in one or more examples, the one or more surveillance services 204 can provide information about the previous state of the target system 202 (denoted in the figure as the system state [T=t−1]) to the strategy generation unit 206 (the operation of which is described in further detail below). In one or more examples, and as described in further detail below, the strategy generation unit 206 can use the previous state of the target network 202 as ascertained by the one or more surveillance services 204 to generate a deception plan to be implemented at the current moment in time (t=T). Thus in one or more examples, and as described in further detail below, the strategy generation unit 206 can use information about a previous state of the target network 202 to generate a deception strategy to be used in real-time on the target network, while the continuous deception operation unit 210 can use information about the current state of the target network and the current plan being implemented to perform its operations.

In one or more examples, and as indicated above, the system 200 can include a strategy generation unit 206. As described above, the strategy generation unit 206 can be configured to generate one or more deception strategies in real-time to be implemented on the target network 202. In one or more examples, the one or more deception strategies generated by strategy generation unit 206 can include the identification of "target objects" (i.e., files that are stored in the target network 202) that can be used to generate decoy files, as well as the identification of directories within the target network 202 to place the generated decoy files within. In one or more examples, the strategy generation unit 206 can take in inputs from the one or more surveillance services 204 (as described above), the continuous deception operation unit 210, and a user 208. In one or more examples, the strategy generation unit can receive a temporal probabilistic model from continuous deception operation unit 210 that it can use to generate a deception strategy. In one or more examples, and as described in further detail below, the temporal probabilistic model can be used by the strategy generation unit 206 to continuously self-improve its ability to create innovative and optimal deception plans to be used against an adversary.

In one or more examples, the strategy generation unit 204 can also receive one or more user inputs from a user 208. In one or more examples, the user inputs received from the user 208 can include various parameters and preferences of the user that the strategy generation unit 206 can use to generate deception plans and strategies. For instance, the information received from the user 208 can include information about the roles, profiles, missions, goals, and adversaries pertaining to the target network and the deception operations. In one or more examples, the user can provide the information to the strategy generation unit 206 via one or more graphical user interfaces provided on a computing machine of the user and that is configured to receive information from the user about the desired deception strategies. In one or more examples, the system 200 can include a continuous deception operation unit 210 that can be configured to provide the strategy generation unit 204 with information about the historical operations of the system over a pre-defined time period so as to provide the strategy generation unit 208 with ways to alter deception plans based on the past data and states associated with the target network 202.

In one or more examples, and at its core, the strategy unit generation unit 206 described above can be configured to generate deception plans that optimize decoy file placement. Optimizing decoy file placement, in one or more examples, can refer to maximizing the cost of intrusion for an adversary while also minimizing the cost of the deception to the target network and its legitimate users. Further, the strategy unit generation 206 as described above can further benefit the target network if the deception operations are performed in real-time and automatically. An optimal deception strategy can take into account not only the characteristics of the target network, but also learned characteristics of the adversary which can evolve over time. Thus, in one or more examples, in order to find optimal strategies, the strategy unit generation unit 206 must engage in continuous learning and evolution to keep up with the changing and evolving tactics of the adversaries. Thus, in one or more examples, the strategy unit generation unit 206 can base its decision on which files to create decoys for, and where to place those decoys in the network based upon various deep learning and machine learning processes to automate the creation of deception plans and ensure that the plans being generated are based on the latest information about the target network as well as the adversaries that threaten the system.

Figure 3:
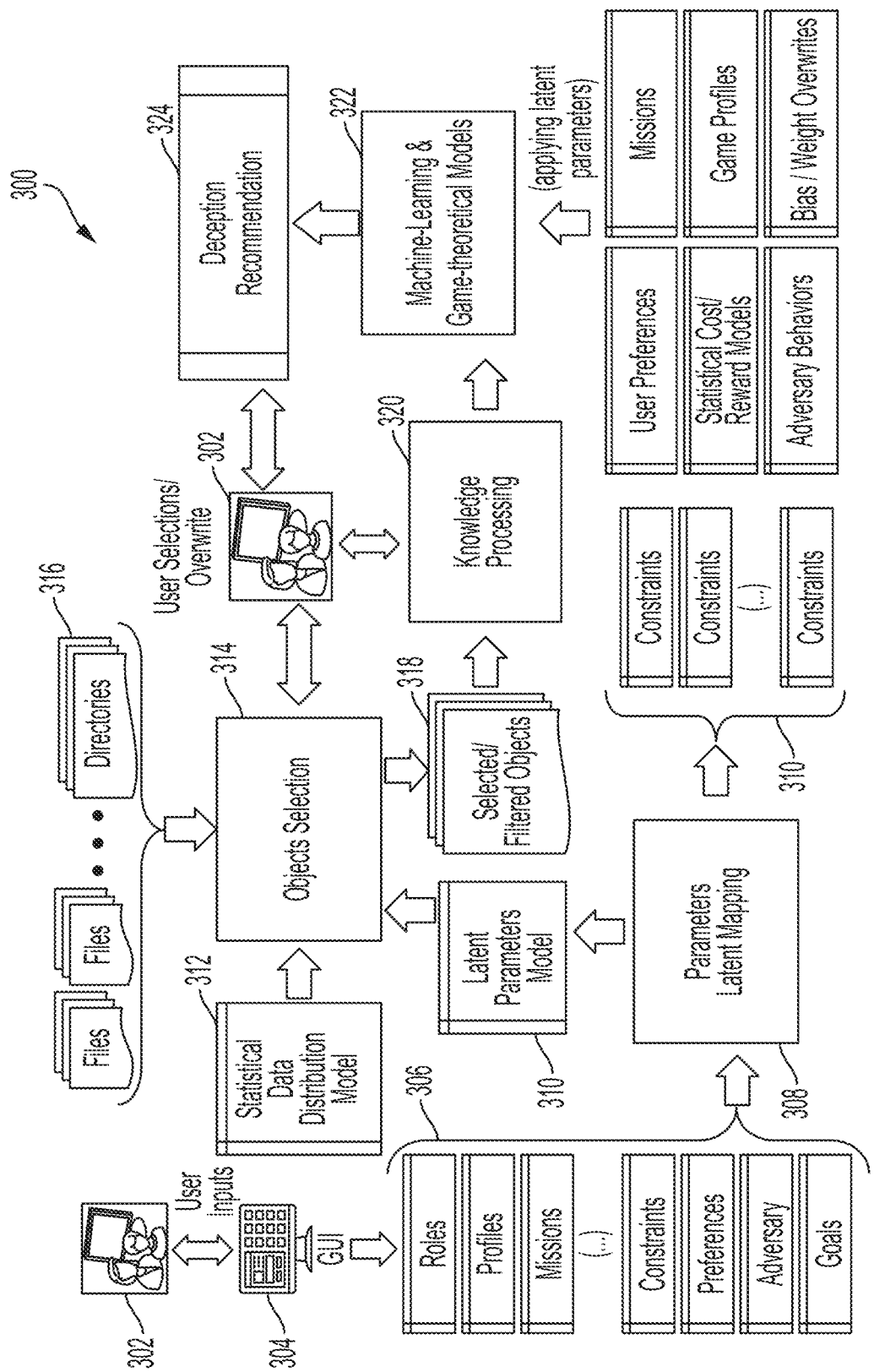
FIG. 3 illustrates an exemplary strategy generation unit according to examples of the disclosure.

FIG. 3 illustrates an exemplary strategy generation unit according to examples of the disclosure. In one or more examples, and as described above, the strategy generation unit 300 can be configured to receive inputs from a user 302 via a graphical user interface 304 that is presented to the user either on their own computing device (which is external to the strategy generation unit 300) or on a graphical user interface that is presented on a display that is associated with the strategy generation unit. In one or more examples, the strategy unit 300 while being described in terms of a block diagram for purposes of illustration, can be implemented on one or more processors that execute software configured to implement the processes described below that are associated with the strategy generation unit. In one or more examples, the user 302 can specify one or more parameters 306 via a GUI 304 that can be used by the strategy generation unit 300 to generation one or more cyber-deception strategies. For instance, and as illustrated in FIG. 3, the parameters 306 specified by the user can include identifying roles of the users or machines in the target network, information about the profiles of various computing resources on a target network or users of the target network, information pertaining to the mission of the target network (i.e., the business purpose or objective that the target network is being used to facilitate). In one or more examples, the parameters 306 can include information about various constraints to be placed on generated strategies and other preferences of the user. In one or more examples, the parameters 306 can include information about the adversary itself as well as goals to be achieved through the deception strategies generated by the strategy generation unit 300.

In one or more examples, the user can express their preferences and information about its system and the system's adversaries in a variety of formats and manners. Thus, rather than requiring a specific format or manner for the user to input their preferences, the strategy generation unit 300 can retain flexibility and interoperability with a variety of external systems by allows the user to input their preferences according to their preferred format. However, in order to use those user expressed preferences to generate deception strategies, the strategy generation unit 300 can map the received user's preferences to an internal data format referred to as a "latent parameters model." In one or more examples, and as illustrated in FIG. 3, the user preference can be input into a latent parameters mapping unit 308 that can be configured to the parameters 306 into a latent parameters model 310 which can refer to a set of internal parameters that are maintained and used by the strategy generation unit 300. In one or more examples, the latent parameters model 310 can include parameters relating to constraints to be imposed on the generated deception strategies, one or more user preferences, various statistical cost/rewards models, one or more adversary behaviors, and missions as illustrated in FIG. 3. In one or more examples, the latent parameters mapping unit 308 can utilize one or more machine learning models that can be used to automatically map (e.g., convert) the user defined parameters 306 to the latent parameters model 310. In one or more examples, the one or more machine learning models can be generated using one or more supervised learning processes in which annotated training data (i.e., mappings of previous user inputs to latent parameters) can be used to train the model.

In one or more examples, the latent parameters model 310 generated from the user defined parameters 306 can be used as inputs to the deception strategy generation process. For instance, in one or more examples, the latent parameters model 310 can be used by an object selection process 314 that is configured to select one or more files within the target network to use to generate decoys that will be placed in the target network to lure an adversary. As described in further detail, the target files or objects can be selected based on information collected from the one or more surveillance services (described with respect to FIG. 2) as well as other data sources. In one or more examples, the output of the object selection process 314 can include one or more selected objects (i.e., files in the target network) that will be used to generate decoy files.

Figure 4:
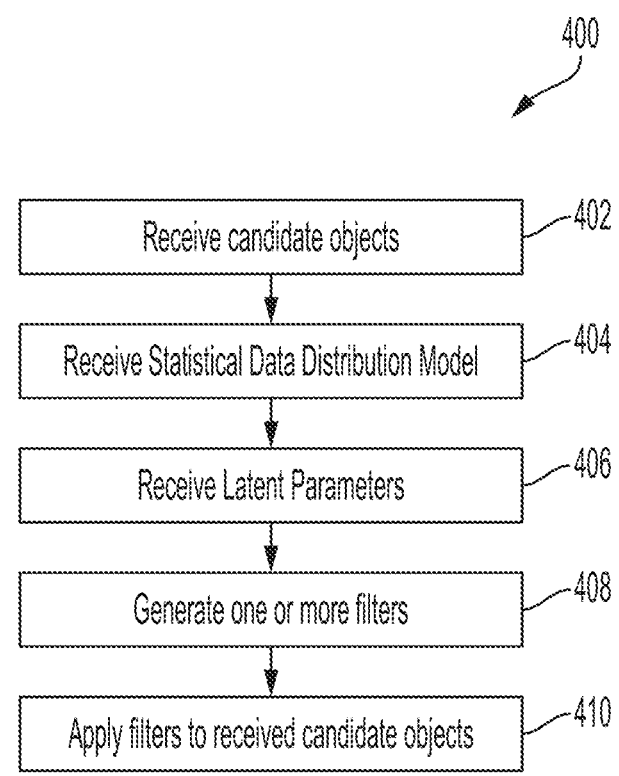
FIG. 4 illustrates an exemplary process for selecting target objects according to examples of the disclosure.

FIG. 4 illustrates an exemplary process for selecting target objects according to examples of the disclosure. In one or more examples, the process 400 illustrated in FIG. 4 can be performed as part of the object selection process 314 of FIG. 3 described above. In one or more examples, the process 400 of FIG. 4 can begin at step 402 wherein one or more candidate objects are received. In one or more examples, the candidate objects can refer to objects associated with the target network for which the deception strategies are being generation. For instance, in one or more examples, the objects received at step 402 can include files, directories, shares, network/cloud storage devices, and desktop files and folders that are found within the target network. In one or more examples, the one or more object received at step 402 can be transmitted from one or more surveillance services (depicted at 204 of FIG. 2) that are configured to analyze the target network and determine its contents and structure as described above. As explained in further detail below, the candidate objects can represent potential files that can be used to generate decoy files. In one or more examples, the process 400 of FIG. 4 can be configured to filter and select candidate object files from the candidate objects received at step 402 on the basis of which objects are more likely to be attractive to an adversary such that the adversary will likely exfiltrate the object from the target network during a cyber-attack.

In one or more examples, either after, before, or in parallel with step 402, the process 400 at step 404 can receive one or more statistical data distribution models associated with the target network. Referring back to FIG. 3, the statistical data distribution model 312 is illustrated as an input to the object selection process. In one or more examples, a statistical data distribution model can refer to information about how the candidate objects received at step 402 are distributed in the target network. In one or more examples, the statistical data distribution model can include information about the behavior of adversaries such as likely targets, likely strategies for infiltration, as well as what information is likely important to adversaries. In one or more examples, the statistical distribution model can include any external information that may influence what objects in a target network would be good candidates for strategic decoy operations. In one or more examples, the objects received at step 402 can inform the process 400 as to the identity of the various files and directories within the target network, while the statistical data distribution model received at step 404 can inform the process 400 as to how those files are distributed in the target network as well an estimated value that those files might have to an adversary. As described in further detail below, the process 400 can use both sets of information to generate a list of candidate objects that can be used to generate one or more decoy files.

In one or more examples, in addition to the candidate objects and the statistical data distribution model received at steps 402 and 404, the process 400 either before, after, or in parallel to steps 402 and 404, the process 400 can receive the latent parameters model at step 406 generated based on the user's inputs as described above with respect to element 310 of FIG. 3. After receiving the candidate objects, statistical data distribution mode, and latent parameters model at steps 402, 404, and 406, the process 400 can move to step 408 wherein one or more filters are generated that are configured to filter the list of candidate objects to extract the one or more files of the target network that will be used by the system 300 of FIG. 3 to generate one or more decoy files. In one or more examples, each filter generated at step 408 can be configured to reduce the number of candidate objects that are in consideration for decoying. For instance, in one or more examples, a list of candidate objects received at step 402 can include tens of thousands of files and directories, however, the system ideally would only like to create a decoy of one hundred files that represent major key targets that an adversary would likely try to exfiltrate using their unauthorized access to the target network. Thus, in one or more examples, the filters generated at step 408 can be configured to reduce the number of candidate objects that will be used to generate decoys. In one or more examples, the filters generated at step 408 can be created based on the information contained within the statistical data distribution model as well as the latent parameters model (i.e., 310) described above.

In one or more examples, the filters generated at step 408 can filter the candidate objects received at step 402 on the basis of metadata associated with each object. For instance, in one or more examples, one or more of the filters generated at step 408 can include a filter that is configured to extract files based on file name or MIME type. In one or more examples, the one or more filters generate at step 408 can include a filter that is configured to extract files (e.g., objects) based on the date that the file was modified/created, the directory path of the files, and/or the user/group access to the each object.

In one or more examples, the filters generated at step 408 can filter candidate objects received at step 402 on the bases of digestion parameters. In one or more examples, digestion parameters can refer to the content of each candidate object (as opposed to metadata which is not part of the content of the file). In one or more examples, digestion parameters can include one or more of the following parameters: keyword matches, similarity scores, and the size/complexity of the object. In one or more examples, the filters generated at step 408 can filter candidate objects based on parameters provided by the user or other external source as defined by the latent parameters model. For instance, in one or more examples, the filters can be generate base on objectives and constraints provided in the latent parameters model described above. The filters described above are meant only for purpose of illustration and should not be seen as limiting to the disclosure. Thus, the one or more filters generate step 408 can be based on any criteria designed to reduce the number of objects being considered for possible decoying, and to identify the objects which will likely be the most attractive to an adversary to exfiltrate from the target network.

In one or more examples, the one or more filters generated at step 408 can include one or more Monte Carlo filters. In one or more, a Monte Carlo filter can refer to a class of filters that use repeated random samples to obtain results. Thus, in one or more examples, a Monte Carlo filter can represent a weaker filter meant to quickly reduce the number of candidate objects without requiring a time and labor intensive process. In one or more examples, the Monte Carlo filter can be configured to generate a quicker result but may not yield all of the objects in the list that match the criteria of the filter. In one or more examples, the one or more filters generated at step 408 can include one or more Las Vegas filters. In one or more examples, a Las Vegas filter can represent a filter that is configured to produce a correct result (i.e., identify all the files in the list of candidate objects that match a criteria) but can take an indefinite amount of time and computing resource to produce a result.

In one or more examples, once the one or more filters have been generated at step 408, the process 400 can move to step 410 wherein the one or more filters are applied to the candidate objects received at step 402 to extract a final list of candidate objects to be used for generation of decoy files. In one or more examples, the Monte Carlo filters described above can be applied first to reduce the number of candidate objects in a manner that uses minimal time and computing resources to implement, and then can be followed with applying the one or more Las Vegas filters that produce a "short-list" of candidate objects using a more time and resource intensive process. In one or more examples, by reducing up-front the number of candidate objects using one or more Monte Carlo filters, the amount of time and resources used to apply the Las Vegas filters can be minimized because the number of files that the Las Vegas filters have to sort through have been reduced by the Monte Carlo filters. In one or more examples, the process 400 of FIG. 4 can thus begin with a large set of candidate objects and at its conclusion can result in a smaller sub-set of candidate objects that are likely to be the types of files that attract an adversary to exfiltrate from the target network.

The process described above with respect to FIG. 4 can result in a set of target objects that represent the files and directories that the target network can seek to protect as part of its deception operation. In other words, in one or more examples, the process of FIG. 4 can determine the files and directories that will be used as part of the decoy operation. However, the question of how to use those files to effect a decoy operation, can involve understanding intelligence about the particular adversary and the techniques they have employed in the target network in order to generate one or more deception strategies to be implemented on the target network. Thus, in one or more examples, the system 300 of FIG. 3 after having figured out what to protect, can then work to generate one or more action plans for how to protect the selected objects 318 generated from the object selection process 314. In one or more examples, after the selected objects (i.e., the one or more files or computing resources) 318 are selected, the strategy generation unit 300 can apply a knowledge processing process 320 to generate one or more action plans (described in further detail below) that the strategy generation unit 300 can use to generate an overall deception plan for use in the target network at a particular moment in time.

In one or more examples, the knowledge processing process 320 can use external knowledge previously acquired regarding the adversary, current knowledge about the adversaries' actions within the target network, as well as user preferences from the user 302 to generate one or more action plans that will be used to generate a deception strategy at a given moment in time to be deployed on the target network. For instance, in one or more examples (and as further described below), the knowledge processing process 320 of the strategy generation unit 300 can receive external information regarding the adversary (which may be received in a non-machine readable form) and map the received information to a parameters model that can be used to rank one or more action templates that can then be filled in with the candidate objects generated by object selection process 314. Each action template can provide the system with an overall guideline for a deception strategy and can be selected based on the external information and user preferences acquired by the knowledge processing process 320. Thus, in one or more examples, the knowledge processing process 320 can generate one or more deception strategy templates, that can then be populated with the actual target objects selected by the object selection process 314 to generate a deception recommendation to the user.

Figure 5:
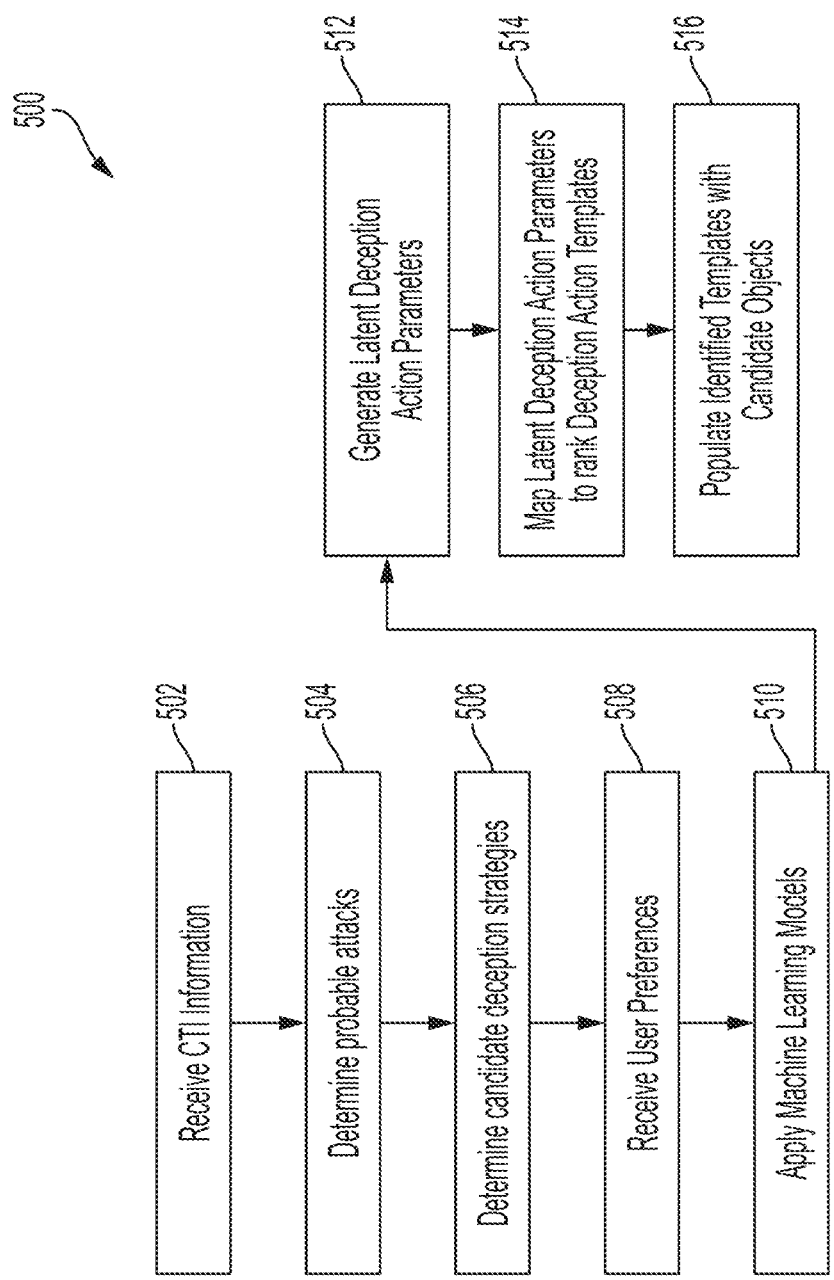
FIG. 5 illustrates an exemplary process for generating deception action plans according to examples of the disclosure.

FIG. 5 illustrates an exemplary process for generating deception action plans according to examples of the disclosure. In one or more examples, the process 500 of FIG. 5 can be implemented using the knowledge processing process 320 of FIG. 3. In one or more examples, the process 500 of FIG. 5 can begin at step 502 wherein cyber threat intelligence (CTI) can be received by process 500. In one or more examples, the CTI information received at step 502 can include information regarding intelligence about known cyber-threats and malicious actors such as information about tactics, past attacks (i.e., exfiltration, phishing, etc.), and other knowledge that can be used to influence selection on one or more action plans. In one or more examples, the information received at step 502 can represent the known techniques that have been used by a particular attacker or set of attackers. Additionally or alternatively, the CTI information can also include real-time information about an adversary's activities within the target network. For instance, referring back to FIG. 2, the information received at step 502 can include information provided by the one or more surveillance services 204 that are monitoring the target network 202 as described above. Thus in one or more examples, the information received at step 502 of process 500 can include information about adversarial activities on the target network being defended, and can also include information about historical adversary activities compiled from various threat databases that report on the tactics and techniques of various cyber attackers.

In one or more examples, once the CTI information is received at step 502, the process 500 can move to step 504, wherein the process can determine one or more probable attacks that are likely are being perpetrated on the target based on the information received at step 502. In one or more examples, at step 504, the process 500 can use one or more knowledge databases, that can map observed adversarial actions to a list of one or more known adversary tactics and techniques. In other words, the information received at step 502 can represent the observed adversarial actions, and at step 504, a knowledge database can be used to determine the most likely tactic, technique, and/or strategy that the adversary is using based on the observed information received at step 502. Using a medical analogy for the purposes of illustration, the information received at step 502 can represent the observed/reported symptoms of the patient as well as information about various medical conditions that have been observed in the community. At step 504, that information is used to generate one or more probable diagnoses of what is occurring with the patient. Using the medical analogy, the knowledge database can represent the knowledge frame that can map the observed symptoms to a medical diagnoses. An example knowledge database can include the MITRE ATT&CK® knowledge base (http://attack.mitre.org) which can include a collection of various adversary techniques to exfiltrate data and the symptoms (i.e, observed adversary activities) that can be associated with those techniques. Thus, in one or more examples, using a knowledge database, at step 504, the process 500 can determine one or more probable attacks that are being perpetrated on the network.

Once the one or more probable attacks have been determined at step 504, the process 500 can move to step 506 wherein one or more candidate deception strategies can be determined at step 506. In one or more examples, generating one or more candidate deception strategies can include consulting a knowledge database (similar to the database discussed above with respect to step 504) that is configured to provide deception strategies based on the type of attack the adversary is perpetrating on a target network. Continuing with the medical analogy provided above with respect to step 504, whereas step 504 sought to diagnose the medical condition, step 506 seeks to provide one or more treatment options to the patient based on the determined medical condition. Thus, at step 506, the process 500 can determine one or more deception strategies (i.e., treatments), based on one or more probable attacks (i.e., diagnoses) determine at step 504. An example knowledge database for determining deception strategies can include the MITRE Engage® knowledge base (http://engage.mitre.org) which can include a collection of various deception strategies and the attacks associated with those deception strategies.

In one or more examples, once the one or more candidate deception strategies have been determined at step 506, the process 500 can move to step 508 wherein one or more user preferences are received. In one or more examples, the information received at step 508 can include information about the target network's mission, any overwrites to the information received at step 502 and 504, and well as any other user preferences that may be pertinent to selecting the type of defenses that will be deployed on the target network at any given moment in time. For instance, in one or more examples, the information received at step 508 can include one or more constraints on the type of actions that the system can take to thwart and adversary's attack. For instance, if the target network belongs to a governmental organization/agency, then in one or more examples, the available deception candidates may be restrained by laws/regulations that would prevent the system from carrying out certain deception strategies.

In one or more examples, once the user preferences are received at step 508, the process 500 can move to step 510 wherein one or more machine learning models are applied to the received information to extract parameters (described in further detail below) that can be used by the process 500 to determine deception strategies to be deployed on the target network. In one or more examples, the information received at steps 502, 504, 506, and 508 can be in a natural language form or some other format that may not be readable by a computing device or machine. Thus, in one or more examples, step 510 can be configured, using one or more machine learning classifiers, to map the information received at steps 502, 504, 506, and 508 to a parameters model (described in further detail below) that can be used by the machine to automate the process of generating deception strategies. In one or more examples, the one or more machine learning models used to the map the received information to the parameters can be generated using one or more supervised learning processes in which a training data set is used to generate the classifiers. For instance in one or more examples, training data can include examples of information received and how that information was mapped to the parameters model. Using the training data, the one or more machine learning classifiers applied at step 508 can map the information received at steps 502, 504, and 506 to the parameters model. Thus, in one or more examples, after applying the one or more machine learning models at step 510, the process 500 can move to step 512 wherein latent deception action parameters using the information received at steps 502, 504, 506, and 508 are converted into the latent deception action parameters using the one or more machine learning models applied at step 510. In one or more examples, the latent deception action parameters can represent abstract actions that the strategy generation unit employs to defend against an adversary. For instance, in one or more examples, the latent deception action parameters can include such abstract actions as the creation of decoy accounts, decoy credentials, decoy content, decoy processes. The latent parameters model can represent the steps to be taken given the information received at steps 502, 504, 506, and 508. In one or more examples, the latent deception action parameters can describe the actions to take without specifying the objects involved in the actions or the specific steps to be taken to implement the actions. As will be described in further detail below, that information can be determined using the latent deception actions parameters generated at step 510.

In one or more examples, after generating the latent deception action parameters at step 512, the process 500 can move to step 514 wherein the latent deception parameters can be mapped to one or more pre-defined action templates. In one or more examples, a pre-defined action template can represent a series of steps or actions and parameters required to effectuate a particular deception. Thus, while the latent deception parameters represent abstract actions to be taken to effectuate a deception strategy, the pre-defined action templates can represent the detailed steps and parameters necessary to implement the abstract actions that have been defined in the latent deception parameters. In one or more examples, each parameter (i.e., abstract action) defined in the latent deception parameters can be mapped to one or more of the pre-defined action templates at step 514. In one or more examples, the pre-defined action templates can be stored in a memory of the system 300 and can be defined ahead of time to represent the steps necessary to implement a particular decoy or deception strategy. In one or more examples, at step 516, the one or more predefined templates can be ranked according to their probability of success. For instance, if at step 506 a certain deception strategy is found to be the most probable at thwarting an adversary, then the one or more templates associated with that strategy can be ranked ahead of other templates associated with other deception strategies that might not have as high a probability of successful. In this way, if any of the templates include actions that may conflict with actions found in other templates, then the template with the higher rank can take precedence and the lower ranked template can be removed from the identified templates.

Figure 6:
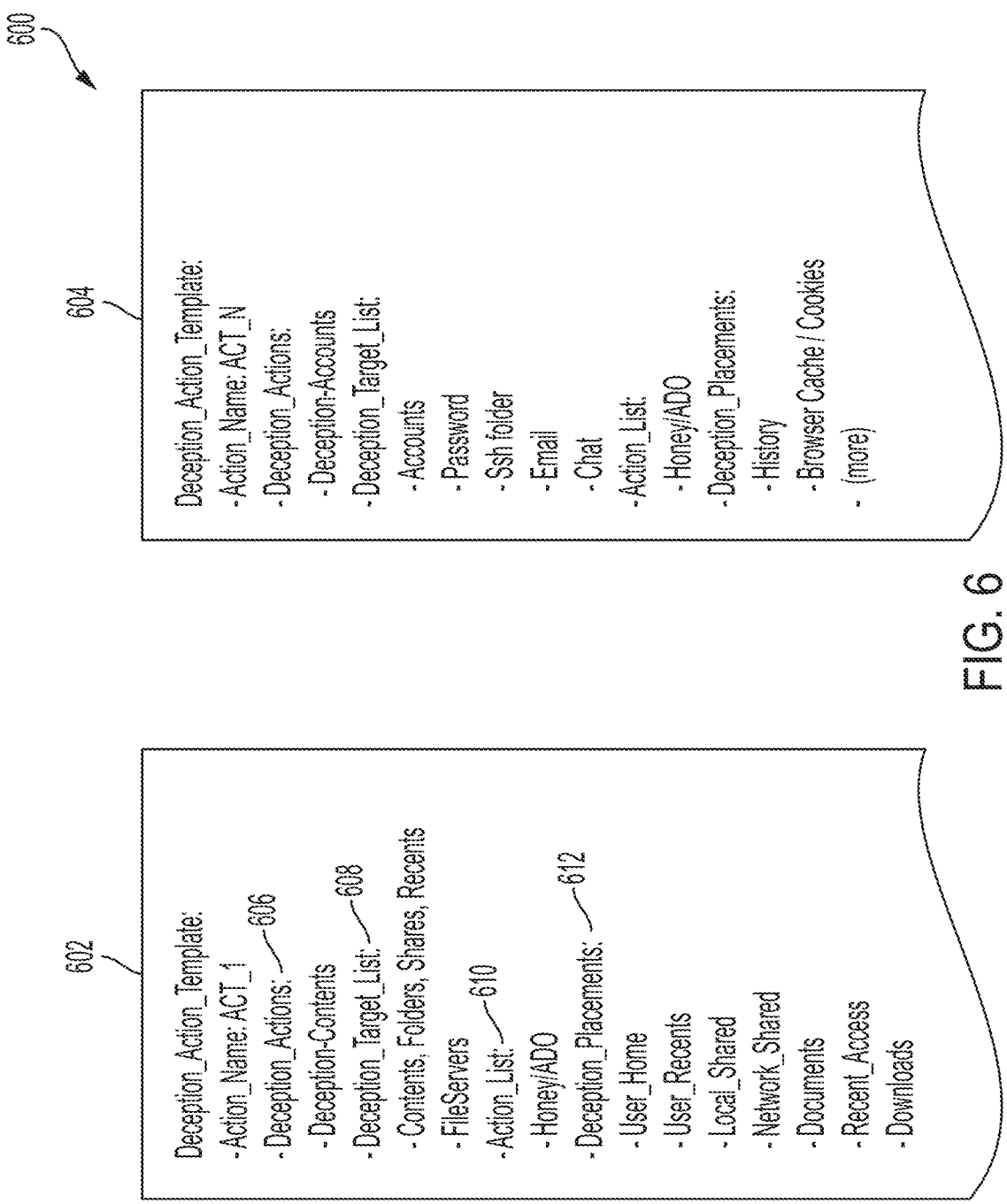
FIG. 6 illustrates an exemplary set of pre-defined action templates according to one or more examples of the disclosure.

FIG. 6 illustrates an exemplary set of pre-defined action templates according to one or more examples of the disclosure. In one or more examples, the templates 602 and 604 illustrated in FIG. 6 can represent examples of the pre-defined action templates as described above with respect to FIG. 5. In one or more examples, the templates 602 and 604 can include the parameters and actions needed to execute a particular type of deception strategy. In one or more examples, the templates 602 and 604, while including the placeholders for parameters, may not actually include the parameters themselves, and thus the templates associated with the latent deception parameters discussed above with respect to FIG. 5, simply provide a the framework for generating a particular deception strategy. As will be described in further detail below, the parameters such as the actual target objects used in the deception operations, can be determined in a subsequent process that is part of the deception strategy generation process described with respect to FIG. 3.

In one or more examples, and as illustrated in FIG. 6, the example templates 602 and 604 can include such parameters at deception action 606, which in one or more examples can provide a guideline for what kind of contents to include in a decoy file. In one or more examples, the templates 602 can include a deception target list 608 which lists the target objects to be included as part of the deception strategy. As explained above, in one or more examples, the deception target list 608 can be filled in a subsequent process that uses the template to build a deception plan that minimizes costs while maximizing rewards. In one or more examples, the templates 602 and 604 can include one or more action lists 610 that specify the actions to be taken as part of the deception strategy associated with the template. In one or more examples, the templates 602 and 604 can include a list of deception placement parameters 612 which can contain a list of locations in the target network to place the decoy files. The template can include placeholders for the placements 612, and the placements can be later filled out using a process as described above that generates the deception strategy to maximize reward, while minimizing risk.

Returning to the example of FIG. 5, once the templates have been identified at step 514, the process can move to step 516 wherein the templates are populated using the candidate objects identified by object selection process 314 of FIG. 3. Thus, in one or more examples, the action templates represent the deception strategies, but populating the templates at step 516 can thus form one or more actual deception strategies that can be used on the target network.

Returning to the example of FIG. 3, the knowledge processing process 320 provides the strategy generation unit 300 with one or more action templates that are recommended based on knowledge regarding cyber-threats as well as knowledge gleaned from an adversary based on their past attacks as described above and then populates those templates with the candidate objects (i.e., the deception files) to form one or more deception actions. Once the actions have been generated, the process can then move to the optimization unit 322, wherein one or more machine-learning and game theoretical models are applied to the generated strategies, to determine what set of strategies generated by the process 500 of FIG. 5 to ultimately use at the next moment in time to not only maximize the reward (i.e., causing the adversary to exfiltrate decoy files) but also minimize cost to the target network for placing the decoy files in the network to lure an adversary. In one or more examples, a reward can include causing the adversary to exfiltrate a decoy file or perform some other action in the target network against their interest, while a cost can represent an action that may frustrate legitimate activities on the target network. Thus, in one or more examples, the final deception strategies can be selected using an optimization process that is configured to minimize risk to the target network and maximize the reward of the decoy (i.e., causing the adversary to exfiltrate the decoy files).

In one or more examples of the disclosure, the optimization unit 322 can implement a optimization search process that can be configured to consider all the combinatorial subsets of candidate deception actions produced by the knowledge processing process 320 so that the optimization unit can apply one or more machine learning and/or game theoretical models to find the best combination of deception actions that will maximize the reward while simultaneously minimizing the cost to the network.

Figure 7:
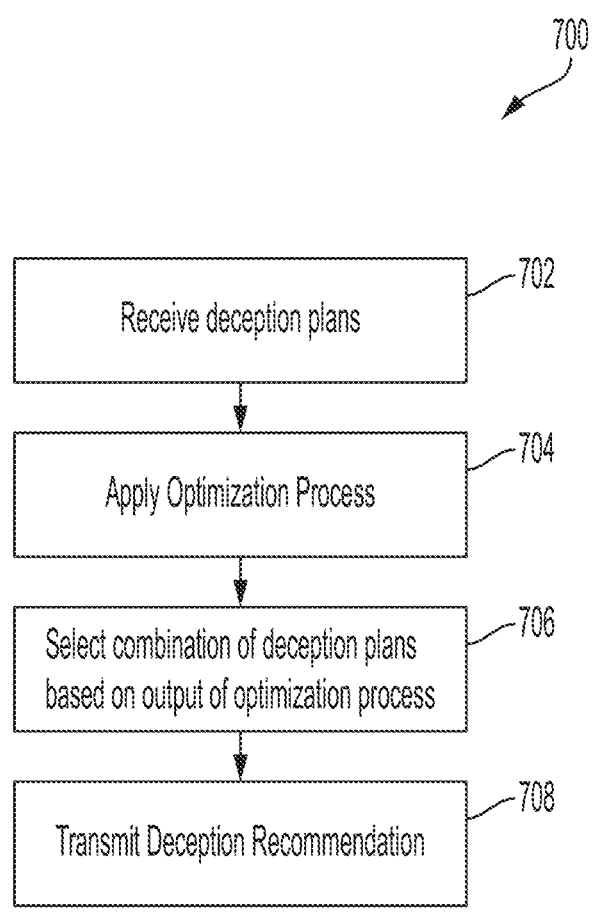
FIG. 7 illustrates an exemplary process for utilizing machine-learning and game theory processes to generate cyber-deception recommendations according to examples of the disclosure.

FIG. 7 illustrates an exemplary process for utilizing machine-learning and game theory processes to generate cyber-deception recommendations according to examples of the disclosure. In one or more examples, the process 700 of FIG. 7 can be configured to take the deceptions plans generated by the process described above with respect to FIG. 6, and select the combination of plans that can maximize the reward while also minimizing cost. In one or more examples, the process 700 can begin at step 702, wherein the deception plans generated by the process 600 of FIG. 6 are received. As described above, the output of process 600 can include multiple deception plans that can all be applied to a target network simultaneously to target a cyber-threat in the target network. While the deception plans may thwart the adversary, they may also frustrate the mission of the target network and frustrate legitimate user who are using the target network. Thus, even though the deception plans generated at step 600 are configured to thwart an adversary, simply using them all may lead to an overall negative result since they may also make the target network unusable or diminish the usability of the target network for its legitimate purposes.

Thus, in one or more examples, once the places have been received at step 702, the process 700 can move to step 704 wherein on or more optimization processes are applied to the received plans with the purpose of selecting the optimal combination of plans from the received plans that can be applied to a target network. As described above, the "optimal" combination can refer to a set of plans that maximize reward while also minimizing cost. In one or more examples, an optimization process can include utilizing a game modeling (i.e., "game theory") approach to search for the optimal combination of deception plans to use on the target network at a given time. In one or more examples, game modeling/game theory can refer to the use of mathematical models to search for optimal outcomes that balance competing factors. In the context of cyber deception operations, the use of game modeling can include creating reward and cost models that can then be used to determine the subset of deception plans to select from the plans received at step 702 that maximize the reward while minimizing the cost.

In one or more examples, the cost model can provide a quantitative assessment representing the cost of implementing a particular strategy. For instance, the cost model can take into account such facts as the time needed to deploy deceptive objects in real-time on the target network, the amount of computing resources that will be occupied by the deception strategy (i.e., CPU/memory/network bandwidth), and any aspects that can cause frustration of the target networks legitimate uses due to deception operations. In one or more examples, the cost model can be pre-defined with values (for instance ranging from 1 to 10) associated with each aspect of the cost model, with a 1 representing a low cost while a 10 for instance representing a high cost.

In one or more examples, the reward model can be similarly configured as the cost model and provide quantitative (i.e., numerical) scores to assess the rewards associated with a particular strategy. For instance, the reward model can include factors such as the increase in the likelihood that that an adversary will exfiltrate a particular deceptive file, the increase in time that an adversary might spend with the decoy files of a particular strategy etc. The optimization process applied at step 704 can thus be configured to use both the reward model and cost model to score various combinations of deception strategies (generated by process 600 of FIG. 6) to determine which combination strikes the optimal balance between reward and cost.

Once the optimization process has been applied at step 704, in one or more examples, the process 700 can move to step 706 wherein the combination of deception strategies received at step 702 is selected. In one or more examples, the selection of the combination of plans at step 706 can be based on the output of the optimization process applied to the received deception plans at step 704. In one or more examples, the combination selected at step 706 can represent an action plan to be applied in a subsequent time period that can represent a single action in a series of actions taken by the target network to frustrate the objectives of the adversary invading the target. Once the combination has been selected at step 706, the process 700 can move to step 708 wherein the selected combination (i.e., recommended deception operation) is transmitted to a user or other entity for consideration for deployment.

Referring back to the example of FIG. 3, the optimization unit 322 can transmit the recommendation (i.e., at step 708), as depicted at 324. The deception recommendation 324 can then be transmitted to a user to either accept the recommendation, modify the recommendation, or rejecting the recommendation. In the event that the user 302 accepts the recommendation, then in one or more examples, the user 302 can implement the recommendation on the target network. In one or more examples, the deception recommendation 324 can be automatically applied to the target network without user intervention.

Referring back to FIG. 2, the strategy generation unit 206 can generate a deception plan for a particular time (T=t) and continuously generate deception plans for each subsequent time thus, providing the target network with a continuously evolving deception operation that can counteract adversarial activity in near real-time. As described in detail above, the strategy generation unit 206 can use various knowledge databases, information about the state of the target network, and user parameters to determine a deception action at a particular moment in time. However, in one or more examples, the strategies/actions generated by strategy generation unit 206 can benefit from historical knowledge about the target network, adversary activities, and past actions to counteract an adversary. In other words, the selection of future deception actions may be influenced by historical patterns or trends relating to the target network that is being defended. Thus, in one or more examples, the system 200 of FIG. 2 can include continuous deception operations unit 210. In one or more examples, the continuous deception operations unit 210 can input information relating to the plan generate by strategy generation unit 206, and the current state of the target network 202 acquired by surveillance services 204 (as shown in the figure) to make adjustments to the information (described in further detail below) used by the strategy generation unit 206 to generate deception actions/plans. In one or more examples, and as described in further detail below, the strategy deception plans can take into account historical information to allow for plans to be chosen that are also responsive to historical patterns regarding the target and the adversary.

Figure 8:
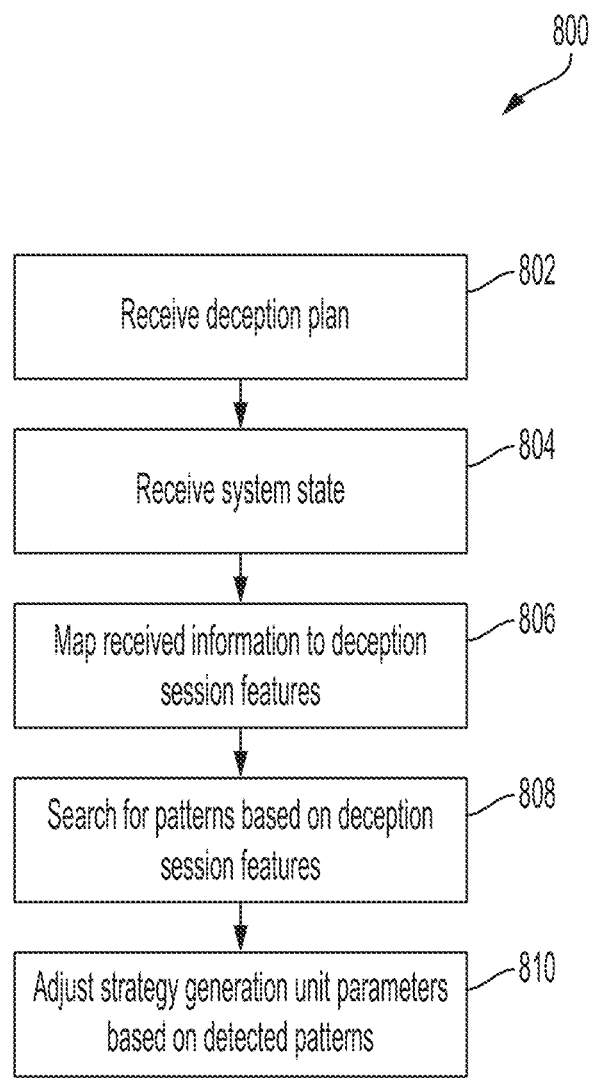
FIG. 8 illustrates an exemplary process for implementing continuous deception operations according to examples of the disclosure.

FIG. 8 illustrates an exemplary process for implementing continuous deception operations according to examples of the disclosure. In one or more examples, the process 800 of FIG. 8 can begin at step 802 wherein the deception plan generated by the strategy generation unit 802 at time=T (i.e, the current plan) is received. At step 804, the process 800 also receives the current system state (i.e., at time=T) from the one or more surveillance services that can collect information about the current state of the target network. Additionally and/or alternatively, the information received at steps 802 and 804 can also include information relating to the latent parameters associated with the received deception plan, as well as information about the cost/reward models used to select the actions associated with the plan.

In one or more examples, once the information is received at steps 802 and 804, the process 800 can move to step 806 wherein the information received at steps 802 and 804 can be mapped to one or more deception session features parameters. In one or more examples, the deception session features parameters can include parameters that are configured to record the overall history of the target network and strategy deception plans in a machine readable manner that can be used to detect patterns. In one or more examples, the patterns can include patterns in deception plans used, patterns in adversarial tactics, and any other historical patterns that could influence the selection of a deception plan. In one or more examples, the deception session features parameters can represent parameters that can be continuously updated and can be used to glean historical insights into the deception strategies used by the target network. For instance, the deception session features can include parameters relating to: historical target network state information, historical information about latent parameters used by the strategy generation unit 206 to generate deception plans, historical information about the various plans generated by the strategy generation unit 206 in the past, and information relating to the cost and rewards models used in the past to generate the past deception actions.

In one or more examples, the process of mapping the information received at steps 802 and 804 can include employing one or more machine learning classifiers that can determine how to modify the deception session parameters in light of the information received at steps 802 and 804. In one or more examples, once the deception session parameters have been updated at step 804 the process 800 can move to step 806 wherein the parameters are analyzed to determine the presence of one or more patterns in the parameters. The one or patterns can include patterns in the parameters that would implicate changes to the models used to select deception actions. For instance, if a target network over a period of time deploys deception strategies in a repetitive or predictable manner, then an adversary could adjust to the pattern to evade the deception strategy. Thus, in one or more examples, at step 808, the process 800 can search for patterns in deception plans used by a target network, since the presence of such a pattern could have an effect on the effectiveness of the deception plan associated with the pattern (i.e, the effectiveness may be reduced due to the plan's predictably.)

In one or more examples, once the patterns have been detected at step 808, the process 800 can move to step 810 wherein the continuous deception operation unit adjusts one or more parameters associated with the strategy generation unit and associated with its process of selecting a deception plan. For instance, using the example above of a repetitive deception plan, at step 810 the continuous deception operations unit can adjust the cost/reward models associated with the optimization unit 322 to reflect that the diminished reward associated with using a predictable deception action. In one or more examples, the adjustments performed at step 810 can also include adjustments to the latent parameters model 310 and any other parameters used to ultimately select deceptions plans for deployment onto a target network. In one or more examples, one or more machine learning models can be applied to the patterns detected at step 808 to determine the necessary adjustments to the parameters made at step 810.

Figure 9:
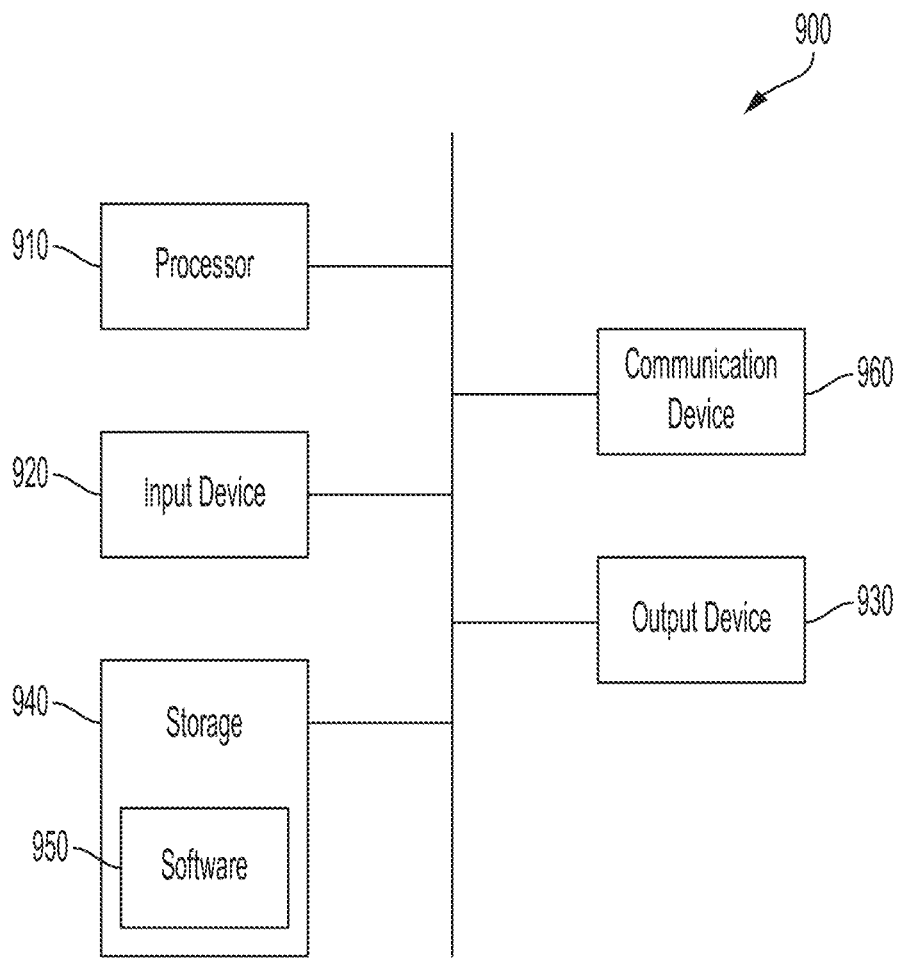
FIG. 9 illustrates an exemplary computing system, according to examples of the disclosure.

FIG. 9 illustrates an example of a computing system 900, in accordance one or more examples. System 900 can be a client or a server. As shown in FIG. 9, system 900 can be any suitable type of processor-based system, such as a personal computer, workstation, server, handheld computing device (portable electronic device) such as a phone or tablet, or dedicated device. The system 900 can include, for example, one or more of input device 920, output device 930, one or more processors 910, storage 940, and communication device 960. Input device 920 and output device 930 can generally correspond to those described above and can either be connectable or integrated with the computer.

Input device 920 can be any suitable device that provides input, such as a touch screen, keyboard or keypad, mouse, gesture recognition component of a virtual/augmented reality system, or voice-recognition device. Output device 930 can be or include any suitable device that provides output, such as a display, touch screen, haptics device, virtual/augmented reality display, or speaker.

Storage 940 can be any suitable device that provides storage, such as an electrical, magnetic, or optical memory including a RAM, cache, hard drive, removable storage disk, or other non-transitory computer readable medium. Communication device 960 can include any suitable device capable of transmitting and receiving signals over a network, such as a network interface chip or device. The components of the computing system 900 can be connected in any suitable manner, such as via a physical bus or wirelessly.

Processor(s) 910 can be any suitable processor or combination of processors, including any of, or any combination of, a central processing unit (CPU), field programmable gate array (FPGA), and application-specific integrated circuit (ASIC). Software 950, which can be stored in storage 940 and executed by one or more processors 910, can include, for example, the programming that embodies the functionality or portions of the functionality of the present disclosure (e.g., as embodied in the devices as described above)

Software 950 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 940, that can contain or store programming for use by or in connection with an instruction execution system, apparatus, or device.

Software 950 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport computer readable medium can include, but is not limited to, an electronic, magnetic, optical, electromagnetic, or infrared wired or wireless propagation medium.

System 900 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

System 900 can implement any operating system suitable for operating on the network. Software 950 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated. For the purpose of clarity and a concise description, features are described herein as part of the same or separate embodiments; however, it will be appreciated that the scope of the disclosure includes embodiments having combinations of all or some of the features described.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A method for generating a cyber deception strategy to be implemented on a computing network, the method comprising:
   receiving one or more user preferences regarding the cyber deception strategy to be implemented on the computing network;
   mapping the received one or more user preferences to one or more parameters using one or more machine learning models;
   receiving a plurality of candidate objects from the computing network, wherein the plurality of candidate objects include one or more files stored on the computing network that will be used to generate decoy files for the cyber deception strategy;
   selecting one or more candidate objects of the plurality of candidate objects to be used in the cyber deception strategy based on the one or more parameters;
   determining one or more cyber-attacks occurring on the computing network;
   generating a plurality of candidate deception actions based on the selected one or more candidate objects and based on the one or more determined cyber-attacks occurring on the computing network;
   applying an optimization process to the to the generated plurality of candidate deception actions, wherein the optimization process is configured to maximize a cost to an attacker associated with implementation of the plurality of candidate deception actions and minimize a cost to legitimate users of the computing network associated with the plurality of candidate deception actions; and
   selecting one or more the of candidate deceptions actions for implementation on the computing network based on one or more results of the optimization process.

2. The method of claim 1, wherein selecting one or more candidate objects of the plurality of candidate objects to be used in the cyber deception strategy comprises applying one or filters to the plurality of candidate objects, wherein each filter is configured to reduce a number of the plurality candidate objects to be selected to be used in the cyber deception strategy.

3. The method of claim 2, wherein the method comprises receiving a statistical data distribution model, wherein the received statistical data distribution model comprises information regarding an efficacy of the one or more candidate objects for use in the cyber deception strategy and wherein generating the one or more filters is based on the received statistical data distribution model.

4. The method of claim 2, wherein the one or more filters are configured to the number of the plurality of candidate objects to be selected to be used in the cyber deception strategy based on metadata associated with the plurality of candidate objects.

5. The method of claim 1, wherein determining one or more cyber-attacks occurring on the target network comprises:
   receiving information regarding a malicious user's activities within the computing network; and
   identifying one or more attack types using an attack knowledge database, wherein the attack knowledge database is configured to relate a malicious user's activities to an attack type.

6. The method of claim 1, wherein generating a plurality of candidate deception actions comprises:
   selecting one or more pre-defined action templates for each generated candidate deception action, wherein each pre-defined action template comprises instructions for implementing the candidate deception action on the computing system, and wherein each pre-defined action template includes one or more placeholders for candidate objects; and
   populating each selected pre-defined action template with the selected one or more candidate objects.

7. The method of claim 6, wherein the method comprises ranking the selected one or more pre-defined action templates for each generated candidate deception action based on a probability of success associated with each selected pre-defined action template.

8. The method of claim 7, wherein the selected one or more pre-defined action templates are removed based on its ranking.

9. The method of claim 1, wherein applying the optimization process comprises using a cost model configured to quantify the cost to legitimate users of the computing network associated with a candidate deception action of the plurality of generated deception actions.

10. The method of claim 9, wherein a cost to legitimate users of the computing network associated with a candidate deception action includes an amount of time required to implement the candidate deception plan on the computing network.

11. The method of claim 1, wherein the method comprises implementing the selected one or more candidate deception actions on the computing network.

12. The method of claim 11, wherein the method comprises:
   receiving information regarding a state of the computing network;
   determining the presence of one or more patterns with the received information and the selected one or more candidate deceptions actions; and
   modifying the optimization process based on the determined presence of one or more patterns.

13. The method of claim 1, wherein the cost to an attacker associated with implementation of the plurality of candidate deception actions comprises exfiltration of one or more decoy files.

14. A system for generating a cyber deception strategy to be implemented on a computing network, the system comprising:
   a memory;
   one or more processors;
   wherein the memory stores one or more programs that when executed by the one or more processors, cause the one or more processors to:
      receive one or more user preferences regarding the cyber deception strategy to be implemented on the computing network;

map the received one or more user preferences to one or more parameters using one or more machine learning models;

receive a plurality of candidate objects from the computing network, wherein the plurality of candidate objects include one or more files stored on the computing network that will be used to generate decoy files for the cyber deception strategy;

select one or more candidate objects of the plurality of candidate objects to be used in the cyber deception strategy based on the one or more parameters;

determine one or more cyber-attacks occurring on the computing network;

generate a plurality of candidate deception actions based on the selected one or more candidate objects and based on the one or more determined cyber-attacks occurring on the computing network;

apply an optimization process to the to the generated plurality of candidate deception actions, wherein the optimization process is configured to maximize a cost to an attacker associated with implementation of the plurality of candidate deception actions and minimize a cost to legitimate users of the computing network associated with the plurality of candidate deception actions; and select one or more the of candidate deceptions actions for implementation on the computing network based on one or more results of the optimization process.

15. The system of claim 14, wherein selecting one or more candidate objects of the plurality of candidate objects to be used in the cyber deception strategy comprises applying one or filters to the plurality of candidate objects, wherein each filter is configured to reduce a number of the plurality candidate objects to be selected to be used in the cyber deception strategy.

16. The system of claim 15, wherein the method comprises receiving a statistical data distribution model, wherein the received statistical data distribution model comprises information regarding an efficacy of the one or more candidate objects for use in the cyber deception strategy and wherein generating the one or more filters is based on the received statistical data distribution model.

17. The system of claim 15, wherein the one or more filters are configured to the number of the plurality of candidate objects to be selected to be used in the cyber deception strategy based on metadata associated with the plurality of candidate objects.

18. The system of claim 14, wherein determining one or more cyber-attacks occurring on the target network comprises:

receiving information regarding a malicious user's activities within the computing network; and identifying one or more attack types using an attack knowledge database, wherein the attack knowledge database is configured to relate a malicious user's activities to an attack type.

19. The system of claim 14, wherein generating a plurality of candidate deception actions comprises:

selecting one or more pre-defined action templates for each generated candidate deception action, wherein each pre-defined action template comprises instructions for implementing the candidate deception action on the computing system, and wherein each pre-defined action template includes one or more placeholders for candidate objects; and populating each selected pre-defined action template with the selected one or more candidate objects.

20. The system of claim 19, wherein the one or more processors are caused to rank the selected one or more pre-defined action templates for each generated candidate deception action based on a probability of success associated with each selected pre-defined action template.

21. The system of claim 20, wherein the selected one or more pre-defined action templates are removed based on its ranking.

22. The system of claim 14, wherein applying the optimization process comprises using a cost model configured to quantify the cost to legitimate users of the computing network associated with a candidate deception action of the plurality of generated deception actions.

23. The system of claim 22, wherein a cost to legitimate users of the computing network associated with a candidate deception action includes an amount of time required to implement the candidate deception plan on the computing network.

24. The system of claim 14, wherein the one or more processors are caused to implement the selected one or more candidate deception actions on the computing network.

25. The system of claim 24, wherein the one or more processors are caused to:

receive information regarding a state of the computing network;

determine the presence of one or more patterns with the received information and the selected one or more candidate deceptions actions; and modify the optimization process based on the determined presence of one or more patterns.

26. The system of claim 14, wherein the cost to an attacker associated with implementation of the plurality of candidate deception actions comprises exfiltration of one or more decoy files.

27. A non-transitory computer readable storage medium storing one or more programs for generating a cyber deception strategy to be implemented on a computing network for execution by one or more processors of an electronic device that when executed by the device, cause the device to:

receive a plurality of candidate objects from the computing network, wherein the plurality of candidate objects include one or more files stored on the computing network that will be used to generate decoy files for the cyber deception strategy;

map the received one or more user preferences to one or more parameters using one or more machine learning models;

select one or more candidate objects of the plurality of candidate objects to be used in the cyber deception strategy based on the one or more parameters;

determine one or more cyber-attacks occurring on the computing network;

generate a plurality of candidate deception actions based on the selected one or more candidate objects and based on the one or more determined cyber-attacks occurring on the computing network;

apply an optimization process to the to the generated plurality of candidate deception actions, wherein the optimization process is configured to maximize a cost to an attacker associated with implementation of the plurality of candidate deception actions and minimize a cost to legitimate users of the computing network associated with the plurality of candidate deception actions; and select one or more the of candidate deceptions actions for implementation on the computing network based on one or more results of the optimization process.

28. The non-transitory computer readable storage medium of claim 27, wherein selecting one or more candidate objects of the plurality of candidate objects to be used in the cyber deception strategy comprises applying one or filters to the plurality of candidate objects, wherein each filter is configured to reduce a number of the plurality candidate objects to be selected to be used in the cyber deception strategy.

29. The non-transitory computer readable storage medium of claim 28, wherein the method comprises receiving a statistical data distribution model, wherein the received statistical data distribution model comprises information regarding an efficacy of the one or more candidate objects for use in the cyber deception strategy and wherein generating the one or more filters is based on the received statistical data distribution model.

30. The non-transitory computer readable storage medium of claim 28, wherein the one or more filters are configured to the number of the plurality of candidate objects to be selected to be used in the cyber deception strategy based on metadata associated with the plurality of candidate objects.

31. The non-transitory computer readable storage medium of claim 27, wherein determining one or more cyber-attacks occurring on the target network comprises:
  receiving information regarding a malicious user's activities within the computing network; and
  identifying one or more attack types using an attack knowledge database, wherein the attack knowledge database is configured to relate a malicious user's activities to an attack type.

32. The non-transitory computer readable storage medium of claim 27, wherein generating a plurality of candidate deception actions comprises:
  selecting one or more pre-defined action templates for each generated candidate deception action, wherein each pre-defined action template comprises instructions for implementing the candidate deception action on the computing system, and wherein each pre-defined action template includes one or more placeholders for candidate objects; and
  populating each selected pre-defined action template with the selected one or more candidate objects.

33. The non-transitory computer readable storage medium of claim 32, wherein the device is caused to rank the selected one or more pre-defined action templates for each generated candidate deception action based on a probability of success associated with each selected pre-defined action template.

34. The non-transitory computer readable storage medium of claim 33, wherein the one or more the selected one or more pre-defined action templates are removed based on its ranking.

35. The non-transitory computer readable storage medium of claim 27, wherein applying the optimization process comprises using a cost model configured to quantify the cost to legitimate users of the computing network associated with a candidate deception action of the plurality of generated deception actions.

36. The non-transitory computer readable storage medium of claim 27, wherein a cost to legitimate users of the computing network associated with a candidate deception action includes an amount of time required to implement the candidate deception plan on the computing network.

37. The non-transitory computer readable storage medium of claim 27, wherein the device is caused to implement the selected one or more candidate deception actions on the computing network.

38. The non-transitory computer readable storage medium of claim 37, wherein the one or more processors are caused to:
  receive information regarding a state of the computing network;
  determine the presence of one or more patterns with the received information and the selected one or more candidate deceptions actions; and
  modify the optimization process based on the determined presence of one or more patterns.

39. The non-transitory computer readable storage medium of claim 27, wherein the cost to an attacker associated with implementation of the plurality of candidate deception actions comprises exfiltration of one or more decoy files.

* * * * *